United States Patent [19]
Epple

[11] Patent Number: 6,027,157
[45] Date of Patent: Feb. 22, 2000

[54] FASTENING ARRANGEMENT FOR A WINDOW WIPER SYSTEM OF A MOTOR VEHICLE AND METHOD OF MAKING SAME

[75] Inventor: Anton Epple, Rottenburg, Germany

[73] Assignee: DaimlerChrysler, Germany

[21] Appl. No.: 09/135,579

[22] Filed: Aug. 18, 1998

[30] Foreign Application Priority Data

Aug. 18, 1997 [DE] Germany ............................ 197 35 818

[51] Int. Cl.⁷ ............................................... B60J 1/02
[52] U.S. Cl. .................. 296/96.15; 296/106; 296/146.8; 15/250.31
[58] Field of Search ............................ 296/96.15, 146.8, 296/106; 15/250.3, 250.31, 250.19, 250.16

[56] References Cited

U.S. PATENT DOCUMENTS

| | | | |
|---|---|---|---|
| 3,016,558 | 1/1962 | Deobel | 15/250.16 |
| 3,019,468 | 2/1962 | Hatch | 15/250.19 |
| 3,415,132 | 12/1968 | Druseikis | 15/250.16 |
| 3,604,048 | 9/1971 | Mainka | 15/250.19 |
| 3,659,308 | 5/1972 | Gute | 15/250.19 |
| 3,681,812 | 8/1972 | Colucci | 15/250.19 |
| 4,009,502 | 3/1977 | Tamaki et al. | 15/250.31 |
| 4,144,614 | 3/1979 | Barbee | 15/250.3 |
| 4,158,247 | 6/1979 | Hanselmann et al. | 15/250.3 |
| 4,310,943 | 1/1982 | Palma | 15/250.16 |
| 4,345,352 | 8/1982 | Terabayshi | 15/250.19 |
| 4,466,153 | 8/1984 | Seibicke | 15/250.16 |
| 4,756,568 | 7/1988 | Yamamoto et al. | 15/250.16 |
| 5,074,613 | 12/1991 | Unterborn et al. | 15/250.31 |
| 5,168,594 | 12/1992 | Imamura | 15/250.16 |
| 5,179,760 | 1/1993 | Abe | 15/250.16 |
| 5,186,064 | 2/1993 | Matsumoto et al. | 15/250.3 |
| 5,261,286 | 11/1993 | Hayashi | 15/250.3 |
| 5,333,351 | 8/1994 | Sato | 15/250.16 |
| 5,388,482 | 2/1995 | Jones et al. | 15/250.16 |
| 5,396,681 | 3/1995 | Hara | 15/250.31 |
| 5,408,719 | 4/1995 | DeRees et al. | 15/250.3 |
| 5,441,227 | 8/1995 | Hayashi | 15/250.3 |
| 5,465,636 | 11/1995 | Jones et al. | 15/250.16 |
| 5,504,966 | 4/1996 | Lee et al. | 15/250.19 |
| 5,507,585 | 4/1996 | Diederich et al. | 15/250.3 |
| 5,570,923 | 11/1996 | Taylor | 15/250.19 |
| 5,826,294 | 10/1998 | Deng | 15/250.16 |
| 5,832,775 | 11/1998 | Turbssi et al. | 15/250.3 |
| 5,836,042 | 11/1998 | Funk et al. | 15/250.3 |
| 5,878,631 | 3/1999 | Muchlpforte et al. | 15/250.3 |
| 5,890,256 | 4/1999 | Eustache | 15/250.3 |

FOREIGN PATENT DOCUMENTS

| | | |
|---|---|---|
| 2806351C2 | 6/1979 | Germany . |
| 3031782A1 | 4/1981 | Germany . |
| 3422171C2 | 12/1984 | Germany . |
| 443635C2 | 10/1995 | Germany . |
| 6-75930 | 10/1994 | Japan . |

Primary Examiner—Joseph D. Pape
Assistant Examiner—Kiran Patel
Attorney, Agent, or Firm—Evenson, McKeown, Edwards & Lenahan, P.L.L.C.

[57] ABSTRACT

A fastening arrangement for a window wiper system of a motor vehicle is provided with a bearing block which has a bearing for a window wiper and with a reinforcing device which can be connected with a body part of the motor vehicle and on which the bearing block is fastened. On an end area, the bearing block is provided with a mushroom-type projection which can be inserted in a larger opening area of a profiled opening of the reinforcing device constructed as a reinforcing plate and, from there, can be displaced for the form-locking connection with the reinforcing plate in an opening area of the opening which is smaller than the maximal diameter or cross-section of the projection. On its other end area, the bearing block is provided with at least one receiving device for a screwed connection for connecting the bearing block with the reinforcing plate.

19 Claims, 1 Drawing Sheet

FASTENING ARRANGEMENT FOR A WINDOW WIPER SYSTEM OF A MOTOR VEHICLE AND METHOD OF MAKING SAME

This application claims the priority of German application 197 35 818.7-22, filed Aug. 18, 1997, the disclosure of which is expressly incorporated by reference herein.

BACKGROUND AND SU Y OF THE INVENTION

The invention relates to a fastening arrangement for a window wiper system of a motor vehicle having a bearing block which has a bearing for a window wiper and having a reinforcing device which can be connected with a body part of the motor vehicle and on which the bearing block is fastened.

From practice, a fastening arrangement of the above-mentioned type is known in the case of which the reinforcing device is constructed as a tubular frame on which the driving motor for the window wiper system is arranged as well as the two bearings for two window wipers. The tubular frame therefore extends almost along the whole vehicle width and is screwed at several points to a body part of the motor vehicle.

It is a disadvantage of this fastening arrangement that it has a very large construction and therefore also a correspondingly high weight. Furthermore, the installation requires relatively high expenditures.

From German Patent Document DE 30 31 782 A1, a window wiper system is known which has a drive for the window wiper blade which is supported on a cantilevered journal. The window wiper system is provided on a rear window which is arranged in a rear wall of a vehicle. Three fastening points are provided for the connection with the rear wall.

From German Patent Document DE 44 13 635 C2, a fastening arrangement is known for a window wiper system with two lateral fastening points as well as a central adjustable holding element, the holding element having two half shells which reach around a holding part of the wiper system.

German Patent Document DE 28 06 351 B1 describes a window wiper arrangement for motor vehicles in which a two-point fastening of a metal sheet is provided which has a screw and a pin.

It is an object of the present invention to provide a fastening arrangement for a window wiper system of the initially mentioned type which, despite its low weight, can be connected with the vehicle body in a stable manner, simultaneously also providing a simple mounting.

According to the invention, this object is achieved by providing a fastening arrangement for a window wiper system of a motor vehicle having a bearing block which has a bearing for a window wiper and having a reinforcing device which can be connected with a body part of the motor vehicle and on which the bearing block is fastened, wherein the bearing block is provided on an end area with a mushroom-type projection which can be inserted in a larger opening area of a profiled opening of the reinforcing device constructed as a reinforcing plate and, from there, can be displaced for the form-locking connection with the reinforcing plate into an opening area of the opening which is smaller than the maximal diameter or cross-section of the projection, and in which case, on its other end area, the bearing block is provided with at least one receiving device for a screwed connection for connecting the bearing block with the reinforcing plate.

By means of the reinforcing plate according to the invention and the type of the suspension of the bearing block in the reinforcing plate, a simple and stable fastening possibility with a body part of the motor vehicle is achieved. Furthermore, the mounting is very simple. Instead of a tubular frame extending along the whole vehicle width, the reinforcing plate with the bearing block according to the invention is now provided only on one side, a connection rod establishing the driving connection to a window wiper motor. On the other side, the bearing block for the second window wiper can be fastened directly in the vehicle body part, by way of a tube part simultaneously a connection being established to the window wiper motor.

In an advantageous further development of the invention, the receiving device for the screwed connection can be provided in the form of two recesses of longitudinal bores or longitudinal slots pointing to the end area with the profiled opening, through which longitudinal bores or slots the screws are fitted which are screwed into threaded bores of the bearing block.

In this manner, a secure three-point fastening of the bearing block is achieved which, however, can be implemented very easily. Thus, no screwed connections are required on the end area with the mushroom-type projection, which will generally be the upper area. Because of the vehicle window which is situated in this area, such screwed connections would present problems with respect to the mounting. In contrast, on the other end area in which the screwed connection is situated, a fastening can be achieved which does not present any problems. Because of the further development according to the invention, the two screwed connections can also be furnished by a supplier already premounted in the bearing block so that only the two screws still have to be tightened during the mounting on the vehicle.

Other objects, advantages and novel features of the present invention will become apparent from the following detailed description of the invention when considered in conjunction with the accompanying drawings.

DETAILED DESCRIPTION OF THE DRAWINGS

Figure 1:
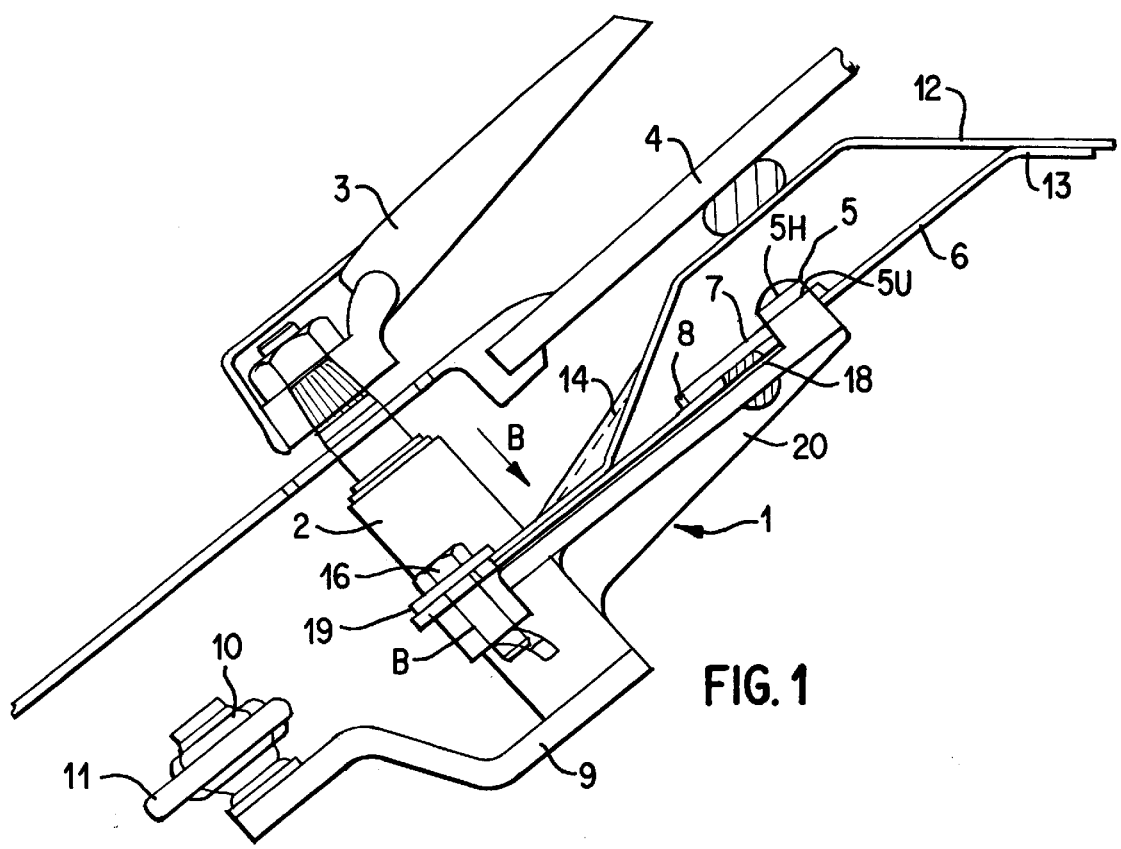
FIG. 1 is a lateral schematic view of a fastening arrangement for a window wiper system of a motor vehicle, constructed according to a preferred embodiment of the invention.

The fastening arrangement for a window wiper system of a motor vehicle has a bearing block 1, having a bearing 2 for a window wiper 3 and a mushroom-type projection 5 which extends on the side facing away from the bearing 2 from the bearing block toward the front in the direction of a vehicle window 4. The mushroom-type projection 5 is flattened on two opposite sides 5S and has an undercut 5U under its head area 5H.

A reinforcing device in the form of a reinforcing plate 6 in a rectangular shape or, as a function of the existing frame, optionally in the form of a parallelogram, has a profiled opening 7 on an end area (in the embodiment shown, in the upper area), which profiled opening has at least approximately the shape of a keyhole, with a longitudinal axis 7A in the direction of the bearing 2. The opening 7 in the reinforcing plate 6 is produced by a punching-out and a higher stability and a better support surface or contact surface for the mushroom-type projection 5 is achieved by means of a rounding-off 8 on its edge. On the bearing 2, a driving lever 9 is also arranged which has a joint head 10 and a driving rod 11 adjoining it for the driving connection with a window wiper motor which is not shown.

The reinforcing plate 6 is connected with the vehicle body part 12 of the vehicle in an upper bent area 13 and in the area of one or several reinforcing ribs 14 of the vehicle body part 12 in each case by a welded connection, such as a spot welding.

In the area facing away from the profiled opening, that is in the lower area, in the embodiment shown, the reinforcing plate 6 is provided with two recesses in the form of longitudinal slots 15 as receiving devices for a screwed connection between the reinforcing plate 6 and the bearing block 1. The screwed connection is established by two screws 16 which are screwed into threaded bores B of the bearing block 1. Between the two longitudinal slots 15, the reinforcing plate is provided with a rounded bearing recess 17 for the bearing 2 of the bearing block 1.

Below the profiled opening 7 and laterally thereof, the bearing block 1 is in each case provided with a rubber-elastic buffer 18.

Figure 2:
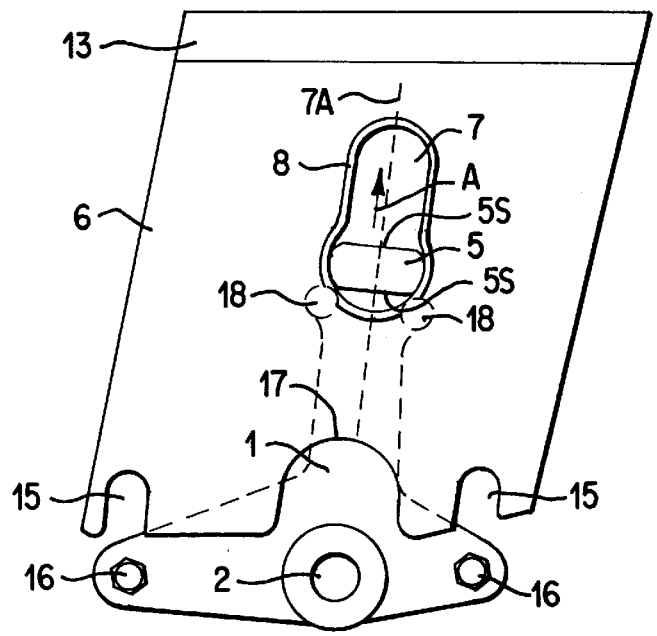
FIG. 2 is a reduced-scale view from the direction of the arrow B of FIG. 1, without showing the vehicle body part to which the reinforcing plate of the fastening arrangement is attached.

The mounting of the fastening arrangement is be carried out as follows: After the welding of the reinforcing plate 6 to the vehicle body part 12, the bearing block is hung by means of its mushroom-head-shaped projection 5 into the profiled opening 7. This takes place in the lower larger opening area of the key hole which, in the transverse direction, has a larger opening width than the width of the head of the mushroom-head-shaped projection 5. Subsequently, the bearing block is displaced in the direction of the arrow A upwards in the direction of the smaller diameter or of the smaller opening area of the profiled opening 7, the screws 16 simultaneously being slid into the longitudinal slots 15 whose longitudinal axes point to the other end of the reinforcing plate 6. The head of the mushroom-type projection, behind which an undercut with a correspondingly smaller width is situated, on the side pointing to the window 4, therefore rests against the edge or the rounding-off 8 of the profiled opening 7. In comparison to FIG. 2, in which the position of the bearing block 1 is illustrated at the beginning of the sliding-in, this end installed position is illustrated in FIG. 1.

For simplifying the mounting, the screws 16 will be rotated slightly into the threaded bores of the bearing block 1 already before the mounting, which can take place, for example, at the manufacturing or supplying facility of the bearing block. This means that the person carrying out the mounting must only, optionally with the interposition of a washer, screw the two screws 16 farther into the threaded bores B of the bearing block 1. By means of the screwing-in of the two screws 16, the bearing block is then pressed against the reinforcing plate 6, the two rubber-elastic buffers 18 providing a contact. In this manner, the bearing block is braced by way of the mushroom-type projection 5 by the rubber-elastic buffers 18, in which case it is simultaneously connected with the fastening plate 6 by the two screws 16 in the lower area. This results in a secure form-locking three-point fastening of the bearing block 1 on the reinforcing plate 6. For reasons of weight, the bearing block 1 may consist of an aluminum diecast part which is correspondingly provided with reinforcing ribs 20. For a secure fastening of the rubber-elastic buffers 18 on the bearing block 1, these buffers can be fitted through bores in the bearing block 1, in which case they have corresponding widenings or enlargements of the diameter on their two ends for fixing the position in the bores.

In another (not shown) embodiment of the bearing block 1, which differs from the present embodiment, it may be provided that this bearing block 1 is made of a fiber-glass-reinforced plastic material. Like components made of aluminum diecast parts, components made of fiber-glass-reinforced plastic materials have a high stability with a low own weight.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Fastening arrangement for a window wiper system of a motor vehicle having a bearing block which has a bearing for a window wiper and having a reinforcing device which can be connected with a body part of the motor vehicle and on which the bearing block is fastened, wherein the reinforcing device includes a profiled opening with a larger cross sectional opening area adjoined by a smaller cross sectional opening area, the bearing block is provided on an end area with a mushroom-type projection which can be inserted in the larger cross sectional opening area of the profiled opening of the reinforcing device constructed as a reinforcing plate and, from there, can be displaced for a form-locking connection with the reinforcing plate into the smaller cross sectional opening area of the profiled opening which is smaller than a maximal diameter or cross-section of the mushroom-type projection, and in which case, on its other end area, the bearing block is provided with at least one connecting device for a screwed connection for connecting the bearing block with the reinforcing plate.

2. Arrangement according to claim 1, wherein two recesses in the form of longitudinal bores or longitudinal slots which point to the end area with the profiled opening are provided as the receiving device for the screwed connection, through which longitudinal bores or longitudinal slots the screws are fitted which are screwed into threaded bores of the bearing block.

3. Arrangement according to claim 1, wherein the profiled opening is constructed at least approximately in the form of a keyhole whose longitudinal axis extends in a displacement direction of the bearing block.

4. Arrangement according to claim 2, wherein the profiled opening is constructed at least approximately in the form of a keyhole whose longitudinal axis extends in a displacement direction of the bearing block.

5. Arrangement according to claim 2, wherein a bearing recess for the bearing of the bearing block is arranged in the reinforcing plate between the two longitudinal slots.

6. Arrangement according to claim 4, wherein a bearing recess for the bearing of the bearing block is arranged in the reinforcing plate between the two longitudinal slots.

7. Arrangement according to claim 1, wherein at least one rubber-elastic buffer is provided between the bearing block and the reinforcing plate in an area of the mushroom-type projection.

8. Arrangement according to claim 2, wherein at least one rubber-elastic buffer is provided between the bearing block and the reinforcing plate in an area of the mushroom-type projection.

9. Arrangement according to claim 6, wherein at least one rubber-elastic buffer is provided between the bearing block and the reinforcing plate in an area of the mushroom-type projection.

10. Arrangement according to claim 7, wherein two of said buffers are provided which are arranged at a distance from one another and are fastened on the bearing block in each case laterally next to the profiled opening.

11. Arrangement according to claim 8, wherein two of said buffers are provided which are arranged at a distance from one another and are fastened on the bearing block in each case laterally next to the profiled opening.

12. Arrangement according to claim 9, wherein two of said buffers are provided which are arranged at a distance from one another and are fastened on the bearing block in each case laterally next to the profiled opening.

13. Arrangement according to claim 1, wherein the profiled opening of the reinforcing plate is provided on its edge with a rounding-off on which the mushroom-type projection rests.

14. Arrangement according to claim 2, wherein the profiled opening of the reinforcing plate is provided on its edge with a rounding-off on which the mushroom-type projection rests.

15. Arrangement according to claim 6, wherein the profiled opening of the reinforcing plate is provided on its edge with a rounding-off on which the mushroom-type projection rests.

16. Arrangement according to claim 9, wherein the profiled opening of the reinforcing plate is provided on its edge with a rounding-off on which the mushroom-type projection rests.

17. Arrangement according to claim 10, wherein the profiled opening of the reinforcing plate is provided on its edge with a rounding-off on which the mushroom-type projection rests.

18. A method of making a window wiper system for a motor vehicle, comprising:

providing an assembly including a bearing block and window wiper blade support bearing supported in the bearing block, said bearing block including a mushroom shaped projection integrally formed therewith which protrudes transversely at one radial side of the support bearing, fixedly attaching a reinforcing plate to a vehicle body part at a position adjacent a lower edge of a vehicle windshield, said reinforcing plate including a profiled opening with a larger cross sectional opening section adjoined by a smaller cross section opening section, said larger opening section being dimensioned to accept said mushroom shaped projection therethrough and said smaller opening being smaller than said mushroom shaped projection, inserting the bearing block mushroom shaped projection through the larger cross sectional opening and then laterally moving the mushroom shaped projection to a position along the smaller cross section to form a form-locking connection between the reinforcing plate and the mushroom shaped projection, and connecting the bearing block to said reinforcing plate at a position spaced from the mushroom shaped projection to thereby fix the bearing block in position on the reinforcing plate.

19. A method according to claim 18, wherein said reinforcing plate includes a pair of slots opening in a direction facing away from an insertion displacement direction of the mushroom shaped projection, and wherein said connecting includes providing screw connections in the bearing block which extend through said slots and clamp the bearing block to the reinforcing plate.

* * * * *